April 30, 1929. W. B. BRONANDER 1,711,038
VARIABLE SPEED TRANSMISSION MECHANISM
Filed June 6, 1925 3 Sheets-Sheet 2
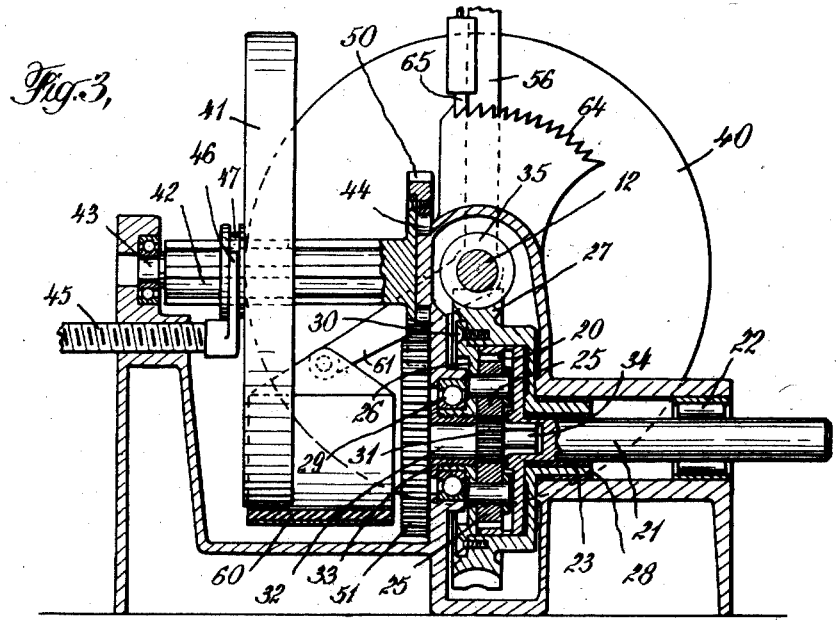
Fig. 3,
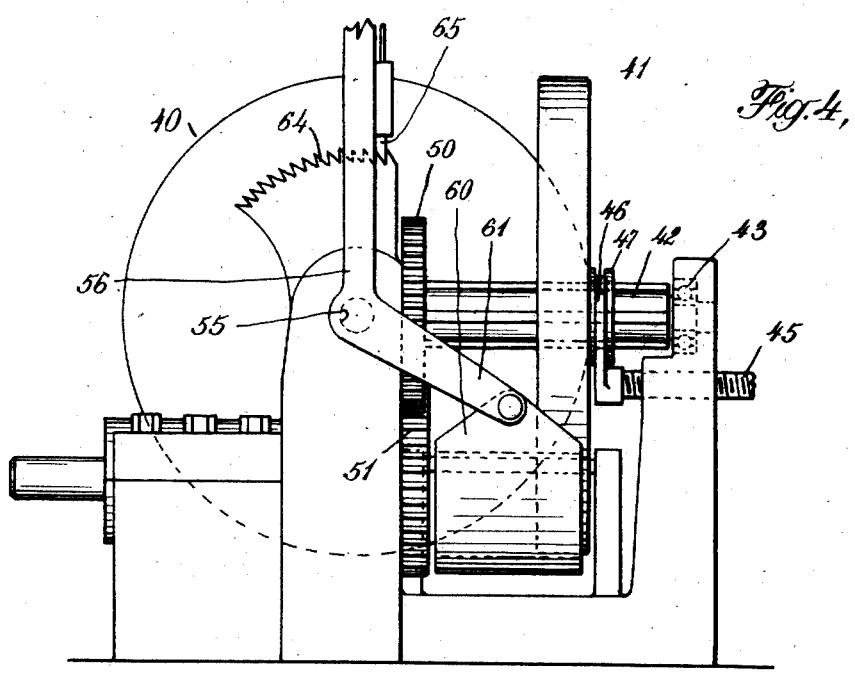
Fig. 4,
INVENTOR
Wilhelm B. Bronander
BY
Marshall & Hawley
ATTORNEYS.

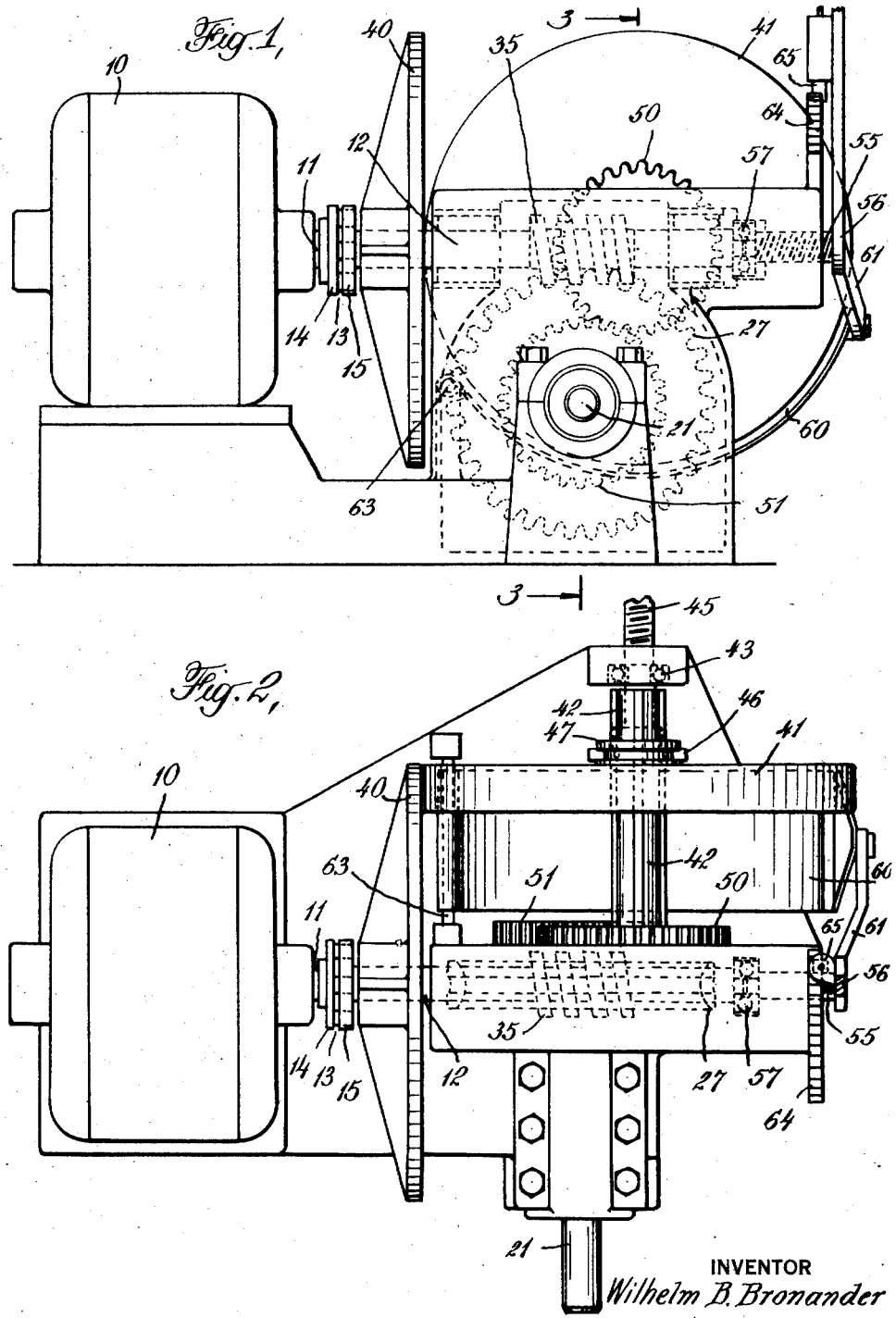

April 30, 1929.  W. B. BRONANDER  1,711,038
VARIABLE SPEED TRANSMISSION MECHANISM
Filed June 6, 1925  3 Sheets-Sheet 3
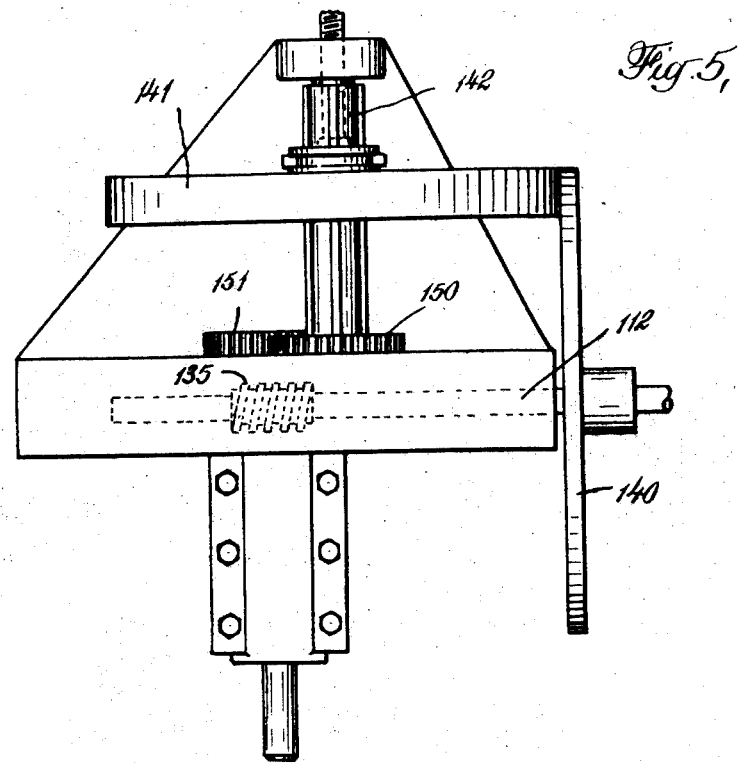
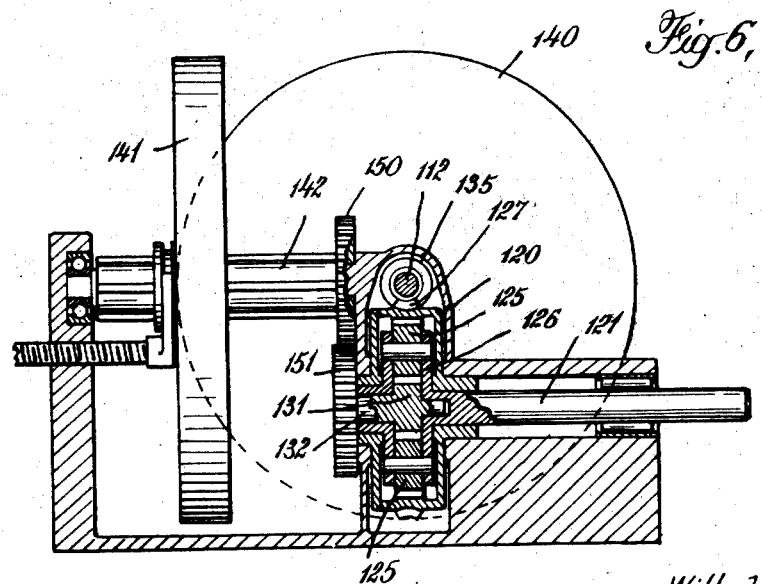
INVENTOR
Wilhelm B. Bronander
BY
Marshall & Hawley
ATTORNEYS Patented Apr. 30, 1929.

1,711,038

UNITED STATES PATENT OFFICE.

WILHELM B. BRONANDER, OF MONTCLAIR, NEW JERSEY.

VARIABLE-SPEED TRANSMISSION MECHANISM.

Application filed June 6, 1925. Serial No. 35,470.

This invention relates to variable speed transmission gearing.

As is well known, practically all of the change speed mechanisms heretofore devised provide for a limited number of speed changes and in changing from one speed to another, speed and driving effort are lost. Moreover, with most of such devices the change must be effected with considerable care and requires considerable skill since certain gears are thrown out of mesh and other gears are thrown into mesh.

This invention has for its salient object to provide mechanism or gearing by means of which any speed from zero to maximum can be readily and easily obtained by the manipulation of simple control means requiring no skill or care for its operation.

Another object of the invention is to provide variable speed mechanism or gearing by means of which an infinite variety of speeds ranging from zero to maximum can be obtained at the will of the operator and without loss of driving effort or speed during the transitional period.

Further objects of the invention will appear from the following specification taken in connection with the drawings, which form a part of this application, and in which Fig. 1 is an elevational view of transmission or gearing constructed in accordance with the invention.

Fig. 2 is a top plan view of the structure shown in Fig. 1.

Fig. 3 is a sectional elevation taken substantially on line 3—3 of Fig. 1.

Fig. 4 is an elevational view of the structure shown in Fig. 1 looking toward the left.

Fig. 5 is a top plan view of another form of gearing constructed in accordance with the invention, and Fig. 6 is a sectional elevation of the structure shown in Fig. 5.

The invention briefly described comprises planetary gearing consisting of the usual ring gear, planet gears and pinion and in carrying out one form of the invention, the drive shaft is operatively connected to drive the planet gears and is also operatively connected through change speed mechanism to drive the pinion. The ring gear in this embodiment is connected to the driven shaft. The gearing and change speed mechanism are so proportioned that the driven shaft can be started at the minimum or low speed and can be brought up to maximum speed gradually. Furthermore, the parts are so constructed and arranged that the driven shaft will be rotated at a minimum speed when the pinion is rotated at maximum speed and will be driven at maximum speed when the pinion is rotating at zero speed or, in other words, is not rotating.

In the other embodiment of the invention, the ring gear and the pinion are operatively connected to the drive shaft and the planet gears are connected to the driven shaft. In this case, as before, the speed of rotation of the pinion is varied from maximum to zero and as this variation is accomplished, the speed of the driven shaft will be varied from low speed to maximum speed.

Further details of the invention will appear from the following description.

*Description of structure shown in Figs. 1 to 4 inclusive.*

A motor 10 is illustrated as the source of power and the motor shaft 11 is connected to drive a shaft 12 by means of a clutch 13. The clutch sections 14 and 15 are permitted a slight relative movement for purposes hereinafter set forth.

A ring gear 20 of the planetary gearing is connected to the driven shaft 21 mounted in bearings 22 and 23. Planet gears 25 are carried by a spider 26 and the spider is secured within a worm gear 27 having a sleeve 28 surrounding the shaft 21. The spider is mounted in ball bearings 29 and is secured to the worm gear by screws 30.

The pinion 31 is carried by a shaft 32 suported at one end in a bearing 33 and having its opposite end reduced as shown at 34 and extending into the recessed end of the shaft 21.

The motor driven shaft 12, which may be termed the drive shaft, has mounted thereon a worm 35 which meshes with and is adapted to drive the worm gear 27.

The shaft 12 also has secured thereto a disk 40 which is adapted to drive a disk 41 disposed at right angles to the disk 40 and slidably splined on a shaft 42 mounted in bearings 43 and 44. Any suitable means can be utilized for sliding the disk 41 on the shaft 42 such as a screw 45 having a yoke or bifurcated end 46 engaging a grooved collar 47.

The shaft 42 has secured to its other end a gear 50 which meshes with the gear 51 mounted on the shaft 32.

Means is provided for shifting the shaft 12 longitudinally to a slight extent to move the disk 40 out of mesh with the disk 41. This means, as illustrated, comprises a screw 55 having secured to one end thereof a lever 56 and adapted to engage a thrust bearing 57 at one end of the shaft 12. As the lever is moved to rotate the screw, a thrust will be placed on the shaft 12, thus forcing the disk 40 out of mesh with the disk 41, this movement being permitted by the clutch sections 14 and 15.

In order to stop the disk 41 from rotating when the disk 40 is moved out of contact therewith, a brake band 60 is secured to the lower end 61 of the lever 56, the opposite end of the brake band being fixed as shown at 63. A toothed segment 64 and a slidable portion 65 carried by the lever are provided for the purpose of holding the lever in adjusted position.

*Operation of structure shown in Figs. 1 to 4 inclusive.*

The gearing above described operates as follows: When the motor or other source of power is started, the disk 41 will be disposed at the periphery of the disk 40. With the parts so positioned and with the gearing proportioned substantially as illustrated, the shaft 21 will not be rotated since the pinion 31 will be rotated at maximum speed and at such a speed that the rotation of this pinion through the disks 40, 41 and gearing 44 and 51 will neutralize the rotation of the planet gears by means of the worm 35 and worm gear 27. The ring gear 20 will, therefore, not be rotated at all.

As the disk 41 is shifted toward the center of rotation of the disk 40, the speed of rotation of the pinion 31 will be decreased and as the speed of rotation of this pinion is decreased, the speed of rotation of the shaft 21 will be correspondingly increased. After the disk 41 has been moved inwardly on the shaft 42 as far as possible, the lever 56 can be swung on its pivot in an anti-clockwise direction (see Fig. 4) and this will cause the disk 40 to be moved out of contact with the disk 41 and also will cause the brake band 60 to grip the disk 41 thereby stopping the rotation of the pinion 31. When the pinion 31 is held from rotation, the shaft 21 will be rotated at its maximum speed.

The movement of the disk 40 out of contact with disk 41 operates in the same manner as throwing out the clutch in other drives.

It will be obvious that the lever can be operated at any time during the operation of the drive—to disconnect the disks and apply the brake.

*Description of structure shown in Figs. 5 and 6.*

In this embodiment of the invention, the ring gear 120 of the planetary gearing has formed on its outer surface a worm gear 127 which is driven by a worm 135 carried by the motor driven shaft 112.

The planet gears 125 are carried by a spider 126 which in this instance is connected to the driven shaft 121.

The pinion 131 is carried by a shaft 132 which is driven through gearing 151 and 150 from the shaft 142 on which is slidably mounted disk 141. The disk 140 is carried by the shaft 112 and is adapted to drive the disk 141, but it should be noted that in this embodiment of the invention, the disk 141 is disposed on the opposite side of the axis of the disk 140 from the disks 41 and 42 in the first embodiment of the invention and, therefore, the shaft 142 will be driven in a direction opposite to the shaft 42. For this reason the pinion 131 will be driven in a direction opposite to the pinion 31 in the other embodiment of the invention.

*Operation of structure shown in Figs. 5 and 6.*

In this form of the invention, the drive is started with the disks in the position shown in Figs. 5 and 6 or, in other words, with the disk 141 disposed at the outer periphery of the disk 140. The gearing is so proportioned that when the disks are positioned as stated, the pinion 131 and the ring gear 120 will be driven at such speeds as to neutralize the drive on the planet gears and the shaft 121 connected to the planet gears will remain stationary. As the disk 141 is moved on the shaft 142, the speed of pinion 131 will be reduced and the speed of the driven shaft 121 will be increased and the shaft 121 will reach its maximum speed when the pinion 131 reaches its minimum speed. If desired, a brake similar to the brake 60 can be utilized to hold the disk 141 against rotation and the disk 140 can be moved out of contact therewith thereby maintaining the pinion 131 stationary.

In both of the embodiments of the invention illustrated, the driven shaft is driven at a slower speed than the drive shaft but the reduction in speed with gearing of the same ratio is less with the structure shown in Fig. 3 than with the structure shown in Fig. 6. In other words, the maximum speed of the driven shaft will be greater with the structure shown in Fig. 3 than with the structure shown in Fig. 6 provided the drive shafts in both cases are driven at the same speed.

It will be understood that the foregoing statement is true of the particular gearing ratios shown but that gearing of different ratios can be used to obtain different results.

It should be noted that the friction gearing or the drive between the disks does not perform any work and, furthermore, as the load on the driven shaft increases, the thrust on the worm forces the disks into closer frictional contact. It should also be noted that when either of the transmissions described is utilized, no clutch is necessary. Furthermore, when the disks are in contact at their peripheries, the driven shaft will be rotated at its slowest speed and as the movable disk is moved toward the axis of the driving disk, the speed of the driven shaft will be increased.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. Transmission mechanism comprising planetary gearing having three gear elements, namely pinion, planet and ring gear elements, a drive shaft operatively connected to drive the pinion and one of the other elements, a driven shaft angularly disposed with respect to the drive shaft and operatively connected to the other of the three elements, and means for disconnecting the drive to the pinion and for stopping the pinion from rotating, comprising a brake for said pinion, a thrust actuated clutch in said drive, and a ratchet controlled member fulcrumed in the axis of said drive shaft and operatively connected to said brake and clutch.

2. Transmission mechanism comprising planetary gearing having three gear elements, namely pinion, planet and ring gear elements, a drive shaft operatively connected to drive the pinion and one of the other elements, a driven shaft angularly disposed with respect to the drive shaft and operatively connected to the other of the three elements, the operative connection to the pinion including means for varying the speed of the pinion, and means for stopping the pinion from rotating, said latter means comprising a ratchet controlled brake fulcrumed in the axis of the drive shaft.

3. Transmission mechanism comprising planetary gearing having three gear elements, namely pinion, planet and ring gear elements, a drive shaft operatively connected to drive the pinion and one of the other elements, a driven shaft angularly disposed with respect to the drive shaft and operatively connected to the other of the three elements, the operative connection to the pinion including means for varying the speed of the pinion, and means for disconnecting the drive to the pinion and for stopping the pinion from rotating, said latter means comprising a brake for said pinion, a thrust actuated clutch in said drive, and a ratchet controlled member fulcrumed in the axis of said drive shaft and operatively connected to said brake and clutch.

4. Transmission mechanism comprising planetary gearing including a pinion, a planet gear and a ring gear, a drive shaft, means including change speed mechanism operatively connecting the drive shaft and pinion, operative driving connections between the drive shaft and planet gear, a driven shaft angularly disposed with respect to the drive shaft and connected to the ring gear, and means for stopping the rotation of the pinion, said latter means comprising a ratchet controlled brake fulcrumed in the axis of the drive shaft.

5. Transmission mechanism comprising planetary gearing having three gear elements, namely pinion, planet and ring gear elements, a drive shaft, means including a change speed disk driving connection between the drive shaft and pinion, a driving connection between the drive shaft and another of said gear elements, a driven shaft angularly disposed with respect to said drive shaft and connected to the third gear element, and means for separating the disks and stopping the disk driving the pinion, comprising a thrust actuated clutch on said drive shaft, an arcuate brake band cradled for engagement with said last named disc, and a ratchet controlled member fulcrumed in the axis of the drive shaft and operatively connected to said clutch and brake.

6. Transmission mechanism comprising planetary gearing having three gear elements, namely, pinion, planet and ring gear elements, a drive shaft, means including a change speed disk driving connection between the drive shaft and pinion, a driving connection between the drive shaft and another of said gear elements and a driven shaft connected to the third gear element, said driving connections including a worm gearing, the pitch of the worm being such that an increase in the load on the driven shaft will force the disks of the change speed disk driving connection into closer frictional contact.

7. Transmission mechanism comprising planetary gearing having three gear elements, namely, pinion, planet and ring gear elements, a drive shaft connected to the planet, means to drive said pinion, a driven shaft connected to the ring gear element, screw operated mechanism in axial alignment with and engageable with said drive shaft, the pitch of the screw being such as to produce longitudinal thrust thereon, thereby to render said pinion drive means inoperative, means for stopping rotation of the pinion comprising a brake fulcrumed in the axis of the drive shaft and connected to the screw operated mechanism to render the pinion drive inoperative simultaneously with the application of the brake.

8. Transmission mechanism comprising planetary gearing having three gear elements, namely, pinion, planet and ring gear elements, a drive shaft connected to the planet, an auxiliary friction drive for said drive shaft to the pinion and a driven shaft connected to the ring gear element, means aligned axially with said drive shaft to disconnect said friction drive, means fulcrumed in the axis of the drive shaft to stop rotation of said pinion, said latter means being connected to said first means to simultaneously disconnect said friction drive and stop rotation of the pinion.

9. Transmission mechanism comprising planetary gearing having three gear elements, namely, pinion, planet, and ring gear elements, a drive shaft connected to the planets, an auxiliary friction drive from said drive shaft to the pinion, and a driven shaft connected to the ring gear element, a screw operated mechanism in axial alignment with and engageable with said drive shaft, the pitch of the screw being such as to produce longitudinal thrust thereon, thereby to disconnect said friction drive, means for stopping the pinion from rotation comprising a brake fulcrumed in the axis of the drive shaft and connected to the screw operated mechanism to simultaneously disconnect the friction drive upon the application of said brake.

In witness whereof, I have hereunto set my hand this 28th day of May, 1925.

WILHELM B. BRONANDER.